United States Patent
Pohl

(10) Patent No.: US 11,802,947 B1
(45) Date of Patent: Oct. 31, 2023

(54) CALIBRATION OF LIDAR ANGULAR OFFSET THROUGH A DYNAMIC ENVIRONMENT

(71) Applicant: Amazon Technologies, Inc., Seattle, WA (US)

(72) Inventor: Nathaniel Pohl, Boulder, CO (US)

(73) Assignee: Amazon Technologies, Inc., Seattle, WA (US)

( * ) Notice: Subject to any disclaimer, the term of this patent is extended or adjusted under 35 U.S.C. 154(b) by 518 days.

(21) Appl. No.: 16/899,415

(22) Filed: Jun. 11, 2020

(51) Int. Cl.
*G01S 7/497* (2006.01)
*G01S 17/86* (2020.01)
*G01S 17/42* (2006.01)

(52) U.S. Cl.
CPC .............. *G01S 7/4972* (2013.01); *G01S 17/42* (2013.01); *G01S 17/86* (2020.01)

(58) Field of Classification Search
CPC .......... G01S 7/4972; G01S 17/86; G01S 17/42
See application file for complete search history.

(56) References Cited

U.S. PATENT DOCUMENTS

| | | | | |
|---|---|---|---|---|
| 7,288,931 | B2* | 10/2007 | Granig et al. | G01D 5/2448 |
| | | | | 324/202 |
| 11,181,640 | B2* | 11/2021 | Baker et al. | B60W 40/105 |
| 2020/0282929 | A1* | 9/2020 | Kroeger | G01S 7/497 |
| 2021/0173055 | A1* | 6/2021 | Jian et al. | G01S 7/497 |

* cited by examiner

*Primary Examiner* — Bryan Bui
(74) *Attorney, Agent, or Firm* — Eversheds Sutherland (US) LLP

(57) ABSTRACT

Embodiments herein describe using a moveable component on a vehicle to calibrate a sensor (e.g., a LIDAR sensor). While a LIDAR sensor can be calibrated using a specially designed configuration component mounted on a vehicle, this increases the cost of manufacturing the vehicle and complexity for identifying a suitable location for the calibration component. Rather than adding a new component, embodiments herein use a moveable component already part of the design of the vehicle as a calibration component. That is, the embodiments herein use components that are primarily used for a different purpose to also perform LIDAR calibration, such as a wheel or a robotic arm.

19 Claims, 6 Drawing Sheets

CALIBRATION OF LIDAR ANGULAR OFFSET THROUGH A DYNAMIC ENVIRONMENT

BACKGROUND

The present invention relates to calibrating a sensor, and more specifically, to identifying errors in offset angles reported by a LIDAR sensor.

Autonomous vehicles and robots can include multiple different types of sensors that generate output data that is then overlaid (or combined) to make decisions such as identifying obstacles, plotting a course for moving through an environment, picking up an object, and the like. To do so, the sensor data needs to use the same common reference axis or point to determine offset angles to objects in the environment. If an object is located directly in front of the vehicle but one sensor says the object is located slightly to the left of the vehicle while another sensor says the object is located slightly to the right, when their output data is combined, the vehicle may determine the object is at the wrong location (or believe there are multiple objects) and thus make a decision based on faulty information. In this example, the reference axes used by the sensors to determine the location of the object relative to the vehicle may be different, thus preventing the sensor data from being combined to provide an accurate representation of the environment.

SUMMARY

According to one embodiment of the present disclosure, a method is provided. The method includes rotating a moveable component attached to a vehicle; capturing, as the moveable component rotates, distance and offset data of the moveable component using a LIDAR sensor attached to the vehicle, wherein the moveable component is in a 2D sensor plane corresponding to the LIDAR sensor, wherein the 2D sensor plane is parallel with the ground; identifying an estimated location of the moveable component in the 2D sensor plane by matching an expected shape of the moveable component to a point cloud corresponding to the distance and offset data; identifying a LIDAR offset angle from a LIDAR reference axis to the estimated location of the moveable component; identifying an offset error by comparing the LIDAR offset angle to a known offset angle to the moveable component; and correcting future offset angles output by the LIDAR sensor using the offset error.

According to a second embodiment of the present disclosure, a system is provided. The system includes a dual-use component configured to perform a primary function and a secondary function, wherein performing the secondary function comprises performing LIDAR calibration; a LIDAR sensor configured to capture data about the dual-use component as the dual-use component actuates when performing LIDAR calibration corresponding to the secondary function; and a processor configured to use the captured data to identify an offset error between a LIDAR reference axis used by the LIDAR sensor and a predefined reference axis for the system.

According to a third embodiment of the present disclosure, a non-transitory computer-readable storage medium is provided. The non-transitory computer-readable storage medium contains computer program code that, when executed by operation of one or more computer processors, performs an operation. The operation includes capturing distance and offset data in a sensor field using a sensor disposed on a vehicle, wherein the distance and offset data corresponds to a wheel disposed on the vehicle; rotating the wheel around a center axis while capturing the distance and offset data; and identifying an offset error between a sensor reference and a predefined vehicle reference using the distance and offset data.

BRIEF DESCRIPTION OF DRAWINGS

Various embodiments in accordance with the present disclosure will be described with reference to the drawings, where like designations denote like elements.

DETAILED DESCRIPTION

Embodiments herein describe using a moveable component on a vehicle to calibrate a sensor (e.g., a LIDAR sensor). While a LIDAR sensor can be calibrated using a specially designed configuration component mounted on a vehicle, this increases the cost of manufacturing the vehicle and complexity for identifying a suitable location for the calibration component. Rather than adding a new component, embodiments herein use a dual-use component already part of the design of the vehicle as a calibration component. That is, the embodiments herein use components that are primarily used for a different purpose to also perform LIDAR calibration, such as a wheel or a robotic arm.

In one embodiment, the dual-use component is rotated or spun - e.g., rotating a wheel 180-360 degrees on a center axis - while the LIDAR sensor collects distance measurements. These distance measurements can be used to form a point cloud for identifying a location of the dual-use component. The LIDAR sensor can then provide an offset angle that is compared to a known offset angle to the dual-use component. This comparison results in an offset error indicating a difference between a reference axis used by the LIDAR sensor and a reference axis used by the vehicle. This offset error can then be used to correct future offset angles generated by the LIDAR sensor, thereby calibrating the LIDAR sensor so its data can, for example, be overlaid or combined with data output by other sensors on the vehicle.

Figure 1:
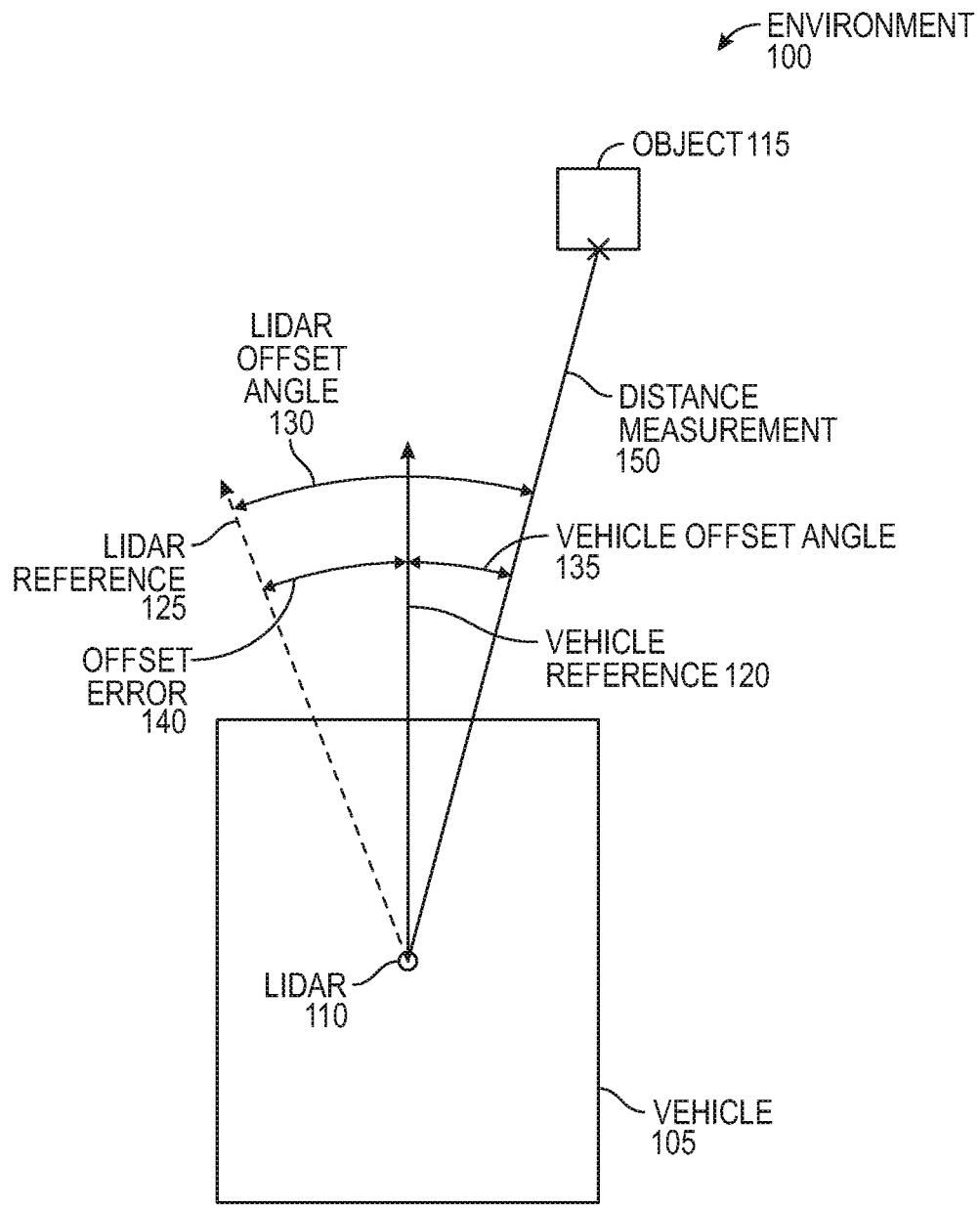
FIG. 1 illustrates an offset error due to a uncalibrated LIDAR sensor, according to one embodiment described herein.

FIG. 1 illustrates an offset error 140 due to an uncalibrated LIDAR sensor, according to one embodiment described herein. FIG. 1 illustrates a top view of an environment 100 that includes a vehicle 105 and an object 115. In one embodiment, the vehicle 105 is an autonomous vehicle that navigates through the environment 100. To do so, the vehicle 105 includes a LIDAR sensor 110 for detecting the object 115 so that the vehicle 105 can traverse a path that avoids the object 115 (or a path that leads the vehicle 105 to the object 115 if the object should be picked up and carried by the vehicle 105). For example, the vehicle 105 may be a cart that carries packages in warehouse, a passenger vehicle, an aerial drone, ship, and the like. While the embodiments herein describe a vehicle, the techniques described herein for calibrating the LIDAR sensor 110 can be applied to many other types of situations such as a LIDAR sensor on a robotic arm or on a proximity warning system. Further, the techniques for calibrating a LIDAR sensor can be applied to other types of sensors that generate an offset angle to detected objects such as infrared sensor or ultrasonic sensors. That is, rotating a moveable component (e.g., a wheel) as described below can be used to calibrate other types of sensors (besides LIDAR sensors) that are mounted on the same vehicle so long as these moveable components are within the sensor fields of the sensors.

In FIG. 1, the vehicle 105 has a vehicle reference 120 that may be an axis, direction, or plane that provides a reference from which offset angles can be identified. For example, the vehicle reference 120 may be the direction the vehicle 105 faces as it travels, or an axis that is normal to a front surface of the vehicle. This vehicle reference 120 can be arbitrarily assigned, but once assigned, remains constant. That is, as the vehicle 105 moves or rotates in the environment 100, the vehicle reference 120 moves along with the vehicle 105 so that the location of the vehicle reference 120 remains constant relative to the vehicle 105. In one embodiment, the vehicle reference 120 provides the reference axis from which offset angles to objects in the environment (e.g., object 115) are measured. For example, the vehicle reference 120 can be thought of as 0 degrees.

The LIDAR sensor 110 has a LIDAR reference 125 (e.g., an axis or direction) from which it measures offset angles to objects in the environment 100. For example, the LIDAR sensor 110 can obtain a distance measurement 150 to the object 115. In addition to reporting the distance from the LIDAR sensor 110 to the object 115, the LIDAR sensor 110 also outputs data indicating a LIDAR offset angle 130 to the object 115. The LIDAR offset angle 130 is the angle between the LIDAR reference 125 and the object 115.

If the LIDAR reference 125 and the vehicle reference 120 are aligned, then the LIDAR offset angle 130 is the same as a vehicle offset angle 135 - i.e., the angle from the vehicle reference 120 to the object 115. However, in FIG. 1, the LIDAR reference 125 is not aligned with the vehicle reference 120, and as a result, the LIDAR offset angle 130 is different than the vehicle offset angle 135. For example, the LIDAR sensor 110 may report a LIDAR offset angle value of 30 degrees while the vehicle offset angle 135 is 10 degrees. In this example, the LIDAR sensor 110 reports that the object 115 is offset 30 degrees from the vehicle 105, when in fact, the object 115 is offset only 10 degrees from the vehicle 105. Thus, the vehicle 105 may make poor decisions based on the inaccurate offset angle reported by the LIDAR sensor 110. For example, the vehicle 105 may plan a path relative to the vehicle reference 120 assuming the object 115 is located 30 degrees from this reference 120 when in fact it is located only 10 degrees. Alternatively, the vehicle 105 may merge the LIDAR sensor 110 data with data output from other sensors, such as an image processing system. For example, the vehicle 105 may have a camera that captures images of the environment 100. The image processing system may indicate, based on the captured images, that the object 115 has a 10 degree offset from the vehicle reference 120 (i.e., the correct offset). However, when this information is overlaid or combined with the LIDAR data, the vehicle 105 may be unable to accurately determine where the object 115 is actually located, or mistakenly believe there are two objects when in fact there is one.

Calibrating the LIDAR sensor 110 can identify an offset error 140 between the LIDAR reference 125 and the vehicle reference 120. Once this offset error 140 is identified, the LIDAR offset angle 130 can be corrected before it is used by the vehicle 105 to make decisions, or before the LIDAR sensor data is overlaid with data from other sensors. For example, if calibration indicates the LIDAR reference 125 is 20 degrees offset from the vehicle reference 120, the LIDAR offset angles 130 reported by the LIDAR sensor 110 can be corrected by this amount (i.e., the offset error 140) so that these values better match the actual offset angles (i.e., the vehicle offset angle 135) which are relative to the vehicle reference 120.

By calibrating the LIDAR sensor 110 as described below, the manufacturer of the vehicle 105 does not have to ensure that the LIDAR reference 125 is precisely aligned with the vehicle reference 120 when the vehicle 105 is assembled. Instead, any misalignment can be accounted for by performing LIDAR calibration when the vehicle 105 is first powered on. Further, calibration can be performed at regular intervals (e.g., once a quarter or biannually) or when troubleshooting the vehicle 105.

Figure 2:
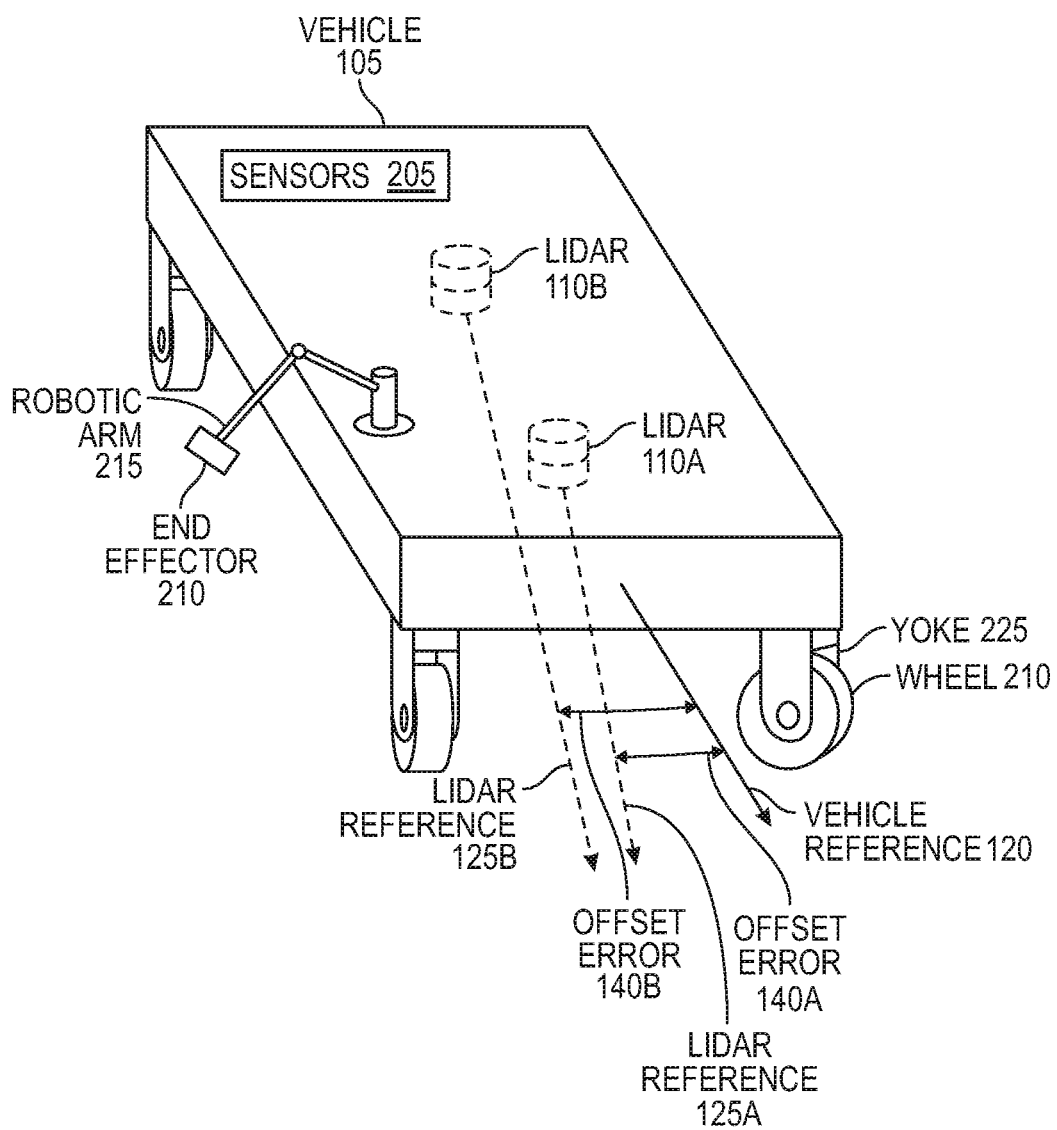
FIG. 2 illustrates a vehicle that can calibrate multiple LIDAR sensors, according to one embodiment described herein.

FIG. 2 illustrates a vehicle 105 that can calibrate multiple LIDAR sensors 110A and 110B (collectively referred to as LIDAR sensors 110), according to one embodiment described herein. In FIG. 2, the vehicle 105 includes two LIDAR sensors 110 that are mounted on a bottom surface of the vehicle 105 (i.e., underneath the vehicle 105) as indicated by the dashed lines. In one embodiment, the LIDAR sensors 110 are 2D planar LIDAR sensors which provide distance measurements along a 2D sensor plane that is parallel to a floor or ground of the environment. For example, this plane may be located a few inches from the ground or floor, depending on the ground clearance of the sensors 110. However, the embodiments herein can be used with LIDAR sensors (or other types of sensors) that have 1D or 3D sensor fields.

In addition to indicating a distance to objects around the vehicle 105 that are within this plane, the LIDAR sensors 110 provide offset angles to the objects based on their respective LIDAR references 125A and 125B (collectively referred to as LIDAR references 125). That is, the LIDAR sensors 110 determine an offset angle between the direction of the object and the LIDAR references 125A and 125B. However, as shown, the LIDAR references 125 do not align with the vehicle reference 120 (i.e., the predefined or desired reference axis or direction) or each other. Thus, any offset angle reported by the LIDAR sensors 110 is affected by offset errors 140A and 140B indicating a difference between the vehicle reference 120 and the respective LIDAR references 125. To correct for these offset errors 140A and 140B, the LIDAR sensors 110 can be calibrated using the techniques described below so that the offset angles are instead based on the vehicle reference 120.

While the vehicle 105 can include a specially designed calibration object for performing LIDAR calibration, this requires adding a new component to the vehicle 105 which adds to its cost and complexity. Further, the specially designed calibration object may have only one purpose: to calibrate the LIDAR sensors 110. But LIDAR calibration may be performed only once (e.g., when the vehicle 105 is first powered on and begins to operate) or very infrequently (e.g., annually or only when troubleshooting an error with the vehicle 105). Thus, the specially designed calibration object may be used rarely or only once, but nonetheless may be permanently mounted to the vehicle 105. While a removable calibration object could be used instead, which an operator attaches to the vehicle 105 when LIDAR calibration is performed and then removes the calibration object once calibration is performed, this requires a human operator to be involved with LIDAR calibration and also introduces the chance of operator error where the human operator may not place the calibration object in precisely the location it needs to be mounted onto the vehicle 105.

Instead of adding a specially designed calibration object to the vehicle 105, in one embodiment, an existing component on the vehicle 105 is used to perform LIDAR calibration. This component is referred to as a dual-use component since it has at least two functions: a primary function and a secondary function (i.e., performing the role as a calibration component during LIDAR calibration). In one embodiment, a wheel 210 is a dual-use component where its primary function is to move the vehicle 105 through the environment while its secondary function is to serve as a calibration object for calibrating the LIDAR sensors 110. While only one of the wheels 210 on the vehicle 105 may be used as the calibration object, calibration may be improved if multiple wheels (or all the wheels) on the vehicle 105 serve as calibration objects during LIDAR calibration.

The vehicle 105 includes yokes 225 which extend down the sides of the wheels 210 so that the wheels can be turned (e.g., to the move the vehicle 105 backwards and forwards) and rotated (e.g., to change the direction the vehicle 105 moves). In addition, the yokes 225 can rotate the wheels 210 around a center axis (while the vehicle 105 generally remains stationary) during the calibration process described below.

Alternatively or additionally, an end effector 220 mounted on a robotic arm 215 may be a dual-use component where its primary function is picking up objects (e.g., by grasping the objects or using a suction action) and moving objects onto and off a top surface of the vehicle 105 while its secondary function is to serve as a calibration object during LIDAR calibration. Because the robotic arm 215 is mounted on the top surface of the vehicle 105 but the LIDAR sensors 110 are disposed on the bottom surface, when performing LIDAR calibration, the robotic arm 215 moves the end effector 220 such that it is disposed below the bottom surface of the vehicle 105, and thus, is detectable by the LIDAR sensors 110. That is, the robotic arm 215 moves the end effector 220 so that it is within the sensor field being sensed by the LIDAR sensors 110. Once LIDAR calibration is complete, the robotic arm 215 can lift up the end effector 220 and perform its primary function. While the embodiments below describe using the wheels 210 as dual-use components for performing LIDAR calibration, the embodiments are not limited to such and can be performed using other components such as the robotic arm 215.

In one embodiment, for reasons described in more detail below, it may be desirable to use a spherical object to perform LIDAR calibration. However, as shown in FIG. 2, the wheels 210 and the end effector 220 are not spherical. In one embodiment, the vehicle 105 spins or rotates the wheels 210 or the end effector 220 around a center axis when performing LIDAR calibration so that these dual-use components represent a circular object (or a partially circular object) in the 2D sensor plane. The orientation of the dual-use component can be synchronized with acquiring the distance and angular offset data by the LIDAR sensors 110 so that the rotating dual-use component can function like a spherical calibration object even though, when stationary, is not spherical (or circular). For example, the end effector 220 may have a rectangular shape. However, when rotated clockwise or counterclockwise in the 2D plane of the LIDAR sensors 205 around a center axis, the end effector 220 can simulate the same circular shape a spherical calibration component would have in the 2D plane. Similarly, by rotating the wheels 210 clockwise or counterclockwise, they too simulate the same circular shape in the 2D plane as a spherical calibration component.

As discussed above, calibrating the LIDAR sensors 110 identifies the offset errors 140A and 140B. These errors 140A and 140B can then be used, during operation of the vehicle 105, to correct the offset angles output by the LIDAR sensors 110. In this example, the vehicle 105 includes additional sensors 205 that, similar to the LIDAR sensors 110, detect objects in the environment and their relative locations to the vehicle 105. These sensors can include cameras (which are part of an image processing system), an infrared sensor, ultrasonic sensor, depth sensor, time of flight sensor, and the like. Because the offset errors 140A and 140B are identified during LIDAR calibration, the LIDAR sensor data can be accurately combined with the environmental data generated by the sensors 205.

Figure 3:
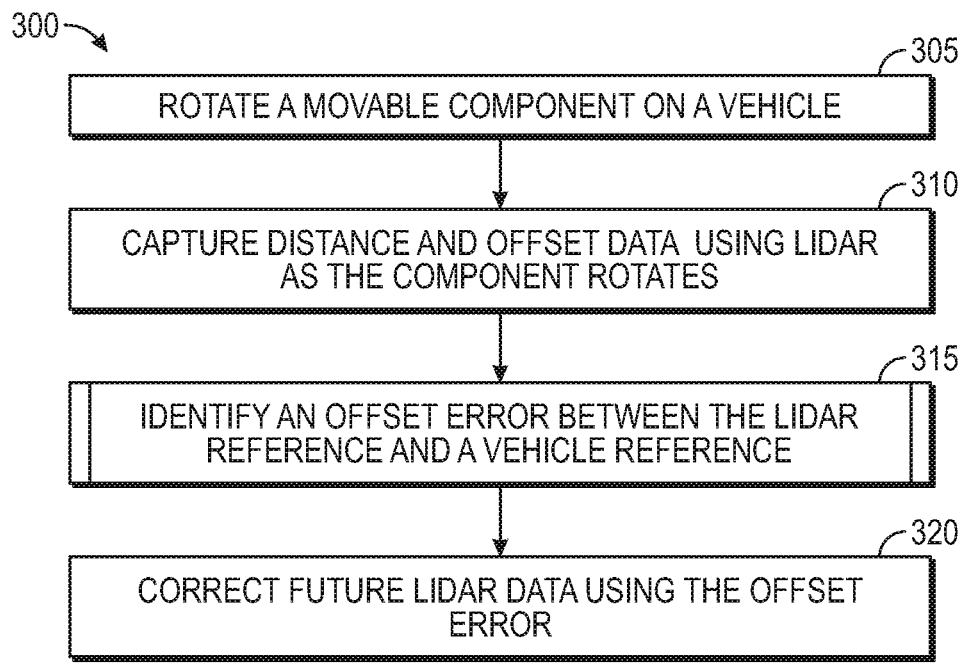
FIG. 3 is a flowchart for calibrating a LIDAR sensor, according to one embodiment described herein.

FIG. 3 is a flowchart of a method 300 for calibrating a LIDAR sensor, according to one embodiment described herein. At block 305, the vehicle rotates a movable component on the vehicle. In one embodiment, the method 300 uses a calibration technique were a moveable, calibration component is rotated to represent a spherical object. However, if the calibration component is spherical (or at least has a round surface in line with the 2D sensor plane of the LIDAR sensor) then the calibration component does not need to be rotated. For example, the calibration component can be a spherical wheel that does not need to be rotated.

In one embodiment, the calibration component is a dual-use component where being used as a calibration component is a secondary function - e.g., a wheel on a cart or a robotic arm. However, the method 300 can be used with a single-use calibration component.

At block 310, the vehicle captures distance and offset data using LIDAR as the component rotates. For example, the LIDAR sensors may rotate to capture data in the 2D plane. The LIDAR sensor (or sensors) may rotate much faster than the moveable component, and as a result, the LIDAR sensor captures many data points as the component rotates. For example, the LIDAR sensor may rotate at 600 revolutions per minute (RPM) while the moveable component may rotate 180 degrees (or 360 degrees) in a 2-10 second time period.

The vehicle collects the data points captured each time the LIDAR sensor rotates. Thus, by the time the moveable component has finished rotating, the LIDAR sensor can capture tens or hundreds of distance measurements and their corresponding angular offsets. These data points can be aggregated to form a point cloud that illustrates the location of the moveable component as it rotates. This point cloud is similar to a long exposure image where image data continues to be captured as objects move.

At block 315, the vehicle identifies an offset error between the LIDAR reference and a vehicle reference. As discussed in more detail in FIG. 4, the vehicle can use the distance and offset data collected as the component rotates to then identify the error between the LIDAR reference and the desired, vehicle reference. For example, the vehicle can use the point cloud to identify the points of the moveable component (e.g., the wheels). The angular offset values to the wheels can then be compared to the known location of the wheels. That is, the vehicle can know, based on the manufacturing process, the actual offset angle from the wheels to the vehicle reference. By comparing the offset angle reported by the LIDAR sensor (or sensors) to the actual offset angle, the vehicle can identify the offset error for each LIDAR sensor.

At block 320, the vehicle corrects future LIDAR data using the offset error. That is, the offset error serves as a calibration reference value so that the offset angles (e.g., angular offset values) reported by the LIDAR sensor can be corrected so they are relative to the vehicle reference. In this way, the LIDAR data can be merged with data output by other sensors that also generate data that is relative to the vehicle reference. That way, the vehicle can know that the offset angles received from multiple sensors are relative to the same reference (i.e., the vehicle reference) which improves the decision making of the vehicle.

In one embodiment, the method 300 is performed by a computer processor and memory disposed on the vehicle that forms a calibration system. For example, the method 300 may be performed using a firmware or software application executing on the computer processor. In another example, the calibration described in the method 300 is performed using a dedicated hardware calibration system. Further, in another embodiment, the method 300 is performed by an external calibration system that transmits instructions to the moveable component and the LIDAR sensor mounted on the vehicle and receives the LIDAR data generated by the LIDAR sensor in order to identify the offset error.

Figure 4:
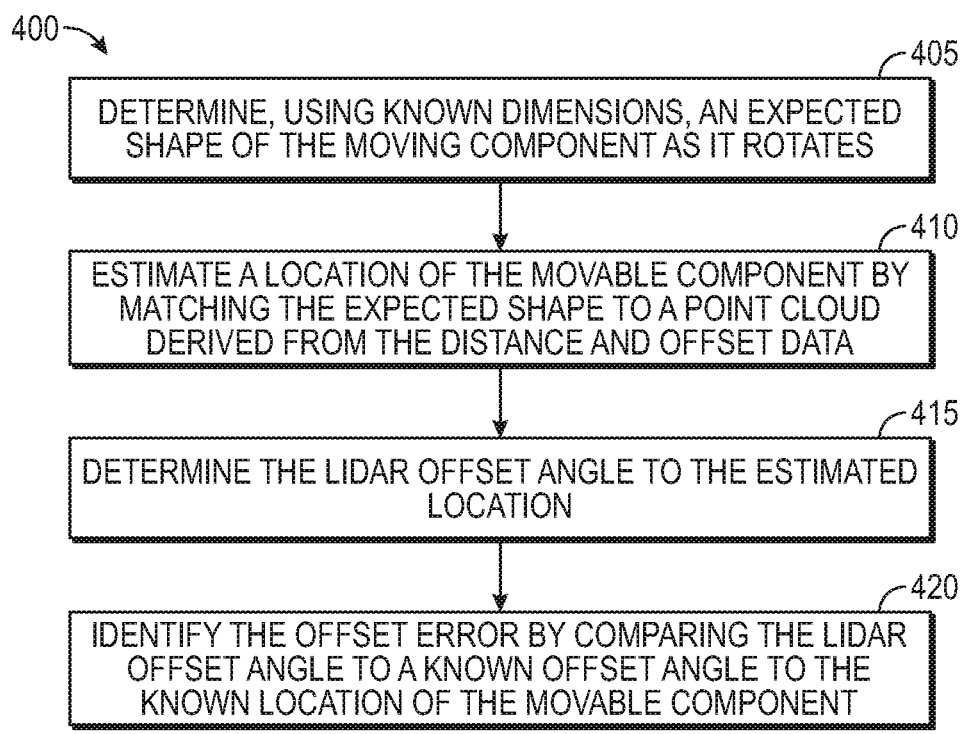
FIG. 4 is a flowchart for identifying the offset error of a LIDAR sensor, according to one embodiment described herein.

FIG. 4 is a flowchart of a method 400 for identifying the offset error of a LIDAR sensor, according to one embodiment described herein. The method 400 describes various techniques for performing block 315 in the method 300 where the offset error between a LIDAR reference and a vehicle reference is identified.

At block 405, the vehicle determines, using known dimensions, an expected shape of the moveable component as it rotates in the 2D plane detected by the LIDAR sensor. For example, assuming a wheel is used as a moveable, calibration component, the wheel should have a circular shape in the 2D plane as it rotates. That is, because the wheel rotates around a center axis, it forms a circle in the 2D plane captured by the LIDAR sensors. This (expected) circular shape can then be used to identify the location of the wheels in the distance data generated by the LIDAR sensor.

However, the expected shape does not need to be completely circular. For example, a wheel or end effector may rotate less than 180 degrees (e.g., only 30 degrees) during sensor configuration, which forms an arc, rather than a complete circle in a 2D sensor plane. For example, a wheel of a car may not be able to turn 180 degrees like the wheel of the vehicle illustrated in FIG. 2. Nonetheless, the method 400 can be used when the moveable component rotates less than 180 degrees in the sensor plane (e.g., only 30, 45, or 90 degrees). In those embodiments, the circular shape may be an arc shape rather than a complete circle.

At block 410, the vehicle estimates a location of the moveable component by matching the expected shape of the component to a point cloud derived from the distance and offset data generated by the LIDAR sensor as the moveable component rotates. As mentioned above, the LIDAR sensor can generate many distance measurements as the moveable component rotates. The data points can be collected and plotted on the 2D sensor plane to generate the point cloud. That is, the expected shape can be matched to aggregated sensor data, whether that aggregated sensor data is represented by a point cloud or some other means.

Figure 5A:
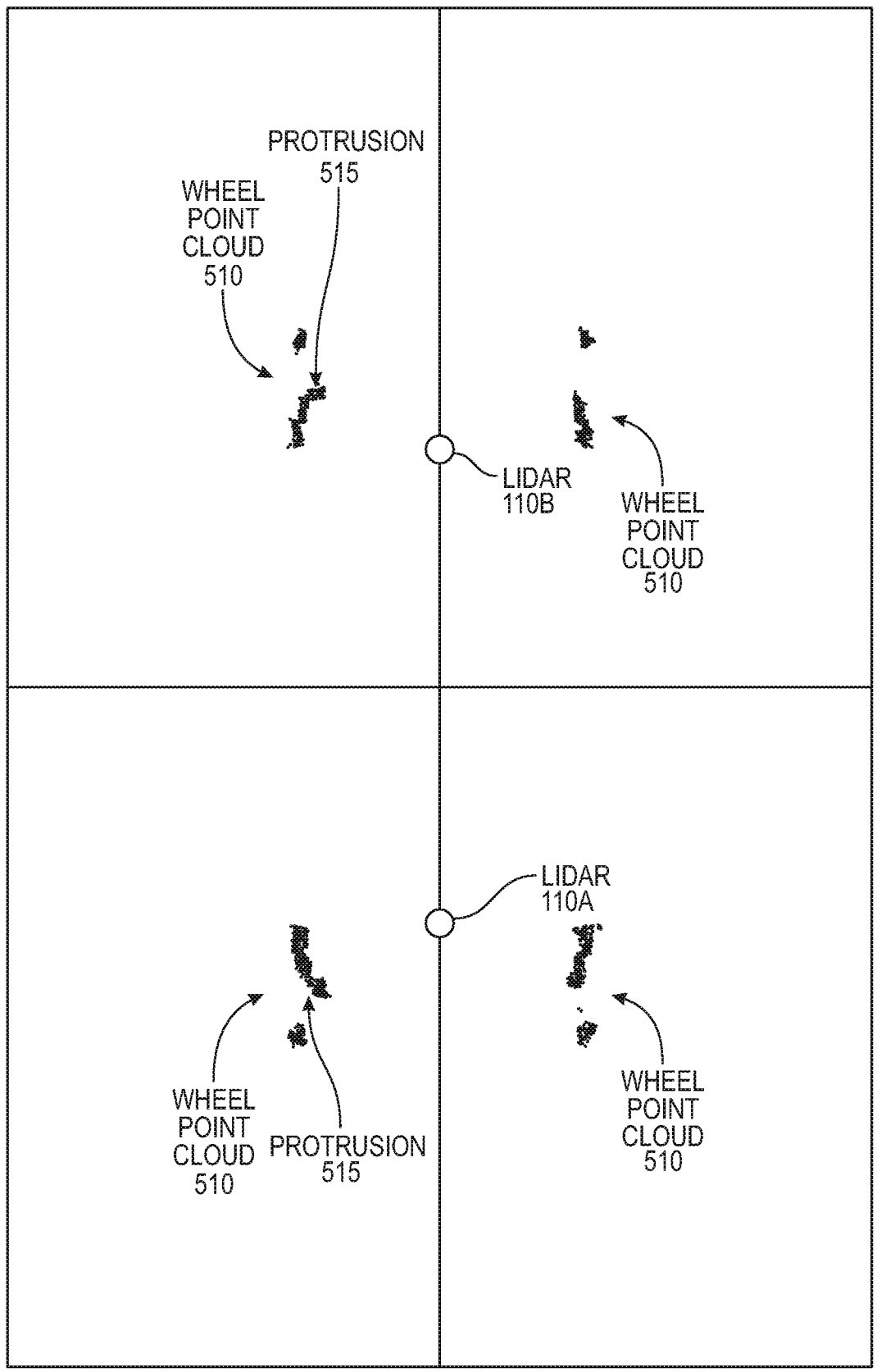
FIGS. 5A and 5B illustrate point clouds used to identify locations of moveable components used to calibrate a LIDAR sensor, according to embodiments described herein.
Figure 5B:
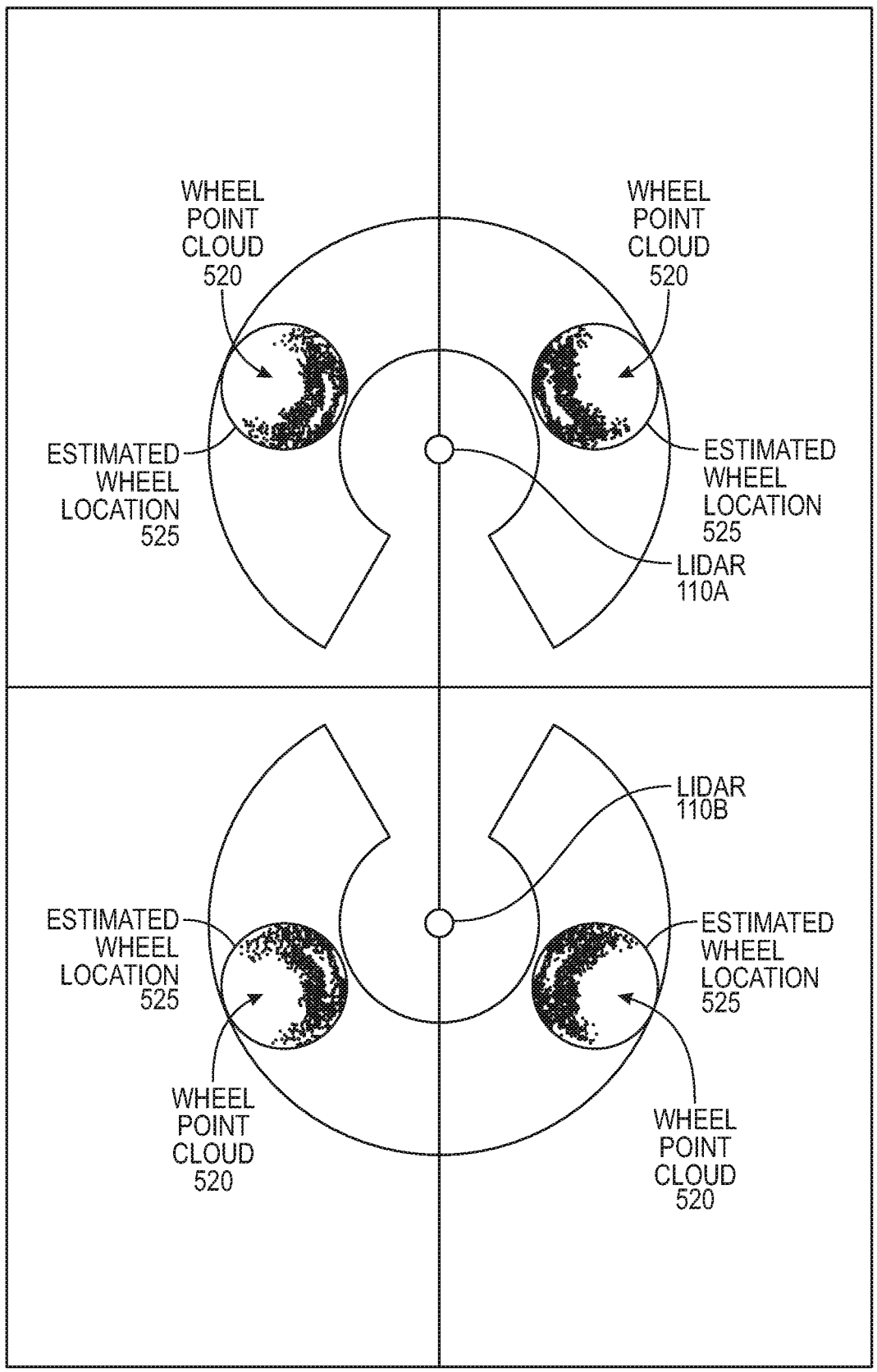

FIGS. 5A and 5B illustrate point clouds 510 used to identify locations of moveable components for calibrating a LIDAR sensor, according to embodiments described herein. For example, FIG. 5A illustrates point clouds 510 that represent distance measurements (or data points) corresponding to the four wheels in the vehicle. That is, FIG. 5A corresponds to the arrangement in FIG. 2 where the vehicle 105 has four wheels 210 and two LIDAR sensors 110A and 110B disposed underneath the vehicle. As a result, the four wheels 210 are represented by respective point clouds 510 in the 2D sensor plane established by the sensors 110A and 110B.

In FIG. 5A, the point clouds 510 are generated when the wheels of the vehicle are stationary. That is, FIG. 5A represents an embodiment where the wheels are used as stationary calibration components, rather than components that rotate as the LIDAR sensors 110A and 110B collect data. The four point clouds 510 in FIG. 5A generally illustrate that the wheels are oriented vertically when the LIDAR data is collected. The point clouds 510 include respective protrusions 515 where laser emitted by the LIDAR sensors 110A and 110B is reflected off the yokes (e.g., the yoke 225 in FIG. 2) disposed on the sides of the wheels. That is, without the yokes, the wheel point clouds 510 would generally form a continuous, vertical line.

While stationary wheels can be used to calibrate the LIDAR sensors 110A and 110B, there are several disadvantages of doing so. The first one is the protrusions 515, which may make the ability to identify the location of the wheels in the 2D plane difficult, especially for some orientations of the wheels. Another disadvantage is that orientation of the wheels may not be controllable with precision. That is, the accuracy of calibration may depend, at least in part, on the ability of the vehicle to know the actual orientation of the wheels. For example, the vehicle may instruct the wheels to orient in the vertical direction (e.g., in a forward direction) to perform calibration, but the actual orientation of the wheels may be slightly angled. This makes trying to identify the wheels using the expected shape (essentially a vertical line or rectangular) difficult given a wheel with an angled orientation will result in a point cloud 510 that is slanted rather than vertical. Attempting to match a slanted point cloud 510 to a vertical line or rectangular may lead to identifying an inaccurate location of the wheel in the 2D plane.

FIG. 5B illustrates generating wheel point clouds 520 as the wheels rotate. In contrast to FIG. 5A which illustrates generally linear point clouds 510 (ignoring the protrusions due to the yoke), FIG. 5B illustrates crescent shaped point clouds 520. These point clouds represent data captured using the sides of the wheels currently facing the LIDAR sensors 110A and 110B. Thus, as the wheels rotates 180 degrees (or more), the LIDAR sensors 110A and 110B collect distance measurements from the surfaces of the wheel currently facing the sensors 110A and 110B which form the crescent shaped patterns. As long as the LIDAR sensors 110A and 110B are rotating faster than the wheels, the point clouds 520 will generally have a crescent shape.

Further, FIG. 5B illustrates estimated wheel locations 525 that illustrate the expected shape of the moveable component. That is, because the wheel rotates as the LIDAR sensors 110A and 110B collect the data, the expected shape of the wheel within the 2D sensor plane of the LIDAR sensors 110A and 110B is a circle. Thus, all the data points captured within the region of the vehicle (e.g., underneath the vehicle) should be within four circles that correspond to the location of the four wheels (assuming there are no other components underneath the vehicle that are within the 2D sensor plane).

As discussed above, at block 405 of the method 400, the vehicle determines the expected shape of the moveable component using its known components - e.g., the diameter of the wheel. This expected shape is reflected by the four circles in FIG. 5B. These expected shapes (e.g., circles) are then moved until they match the locations of the wheel point clouds 510. Once the expected shapes overlaps the point clouds 520, this indicates the estimate wheel locations 525.

In one embodiment, the calibration system uses a searching algorithm to match the expected shapes to the point clouds. For example, because the separation distances between the wheel locations and the locations of the LIDAR sensors 110A and 110B are known, the search algorithm can move the expected shapes through a search area indicated by the C-shaped regions in FIG. 5B. As the expected shapes are moved, the calibration system notes how much of the point clouds 520 (e.g., how many of the data points forming the point clouds 520) are contained within the expected shape. The location where the expected shape includes the most of the points forming the wheel point clouds 520 is then assigned as the estimated wheel location 525.

In one embodiment, the calibration system uses multiple iterations to search the C-shaped search areas. Each time a search is performed, the calibration system identifies a sub-region in the search area where the expected shaped contained the most number of the data points in the point cloud 520. For example, the calibration system may move the expected shape a first predefined interval (e.g., the distance of the diameter or radius of the expected shape) and measure how much of the point cloud 520 (if any) is contained within the expected shape. During a subsequent iteration, the calibration system may search a sub-region that is around the location of the expected shape that contained the most of the data points in the point cloud 520 but use a smaller interval than the first predefined interval to move the expected shape in the sub-region. By identifying the portion of the sub-region that again resulted in the expected shaped containing the most of the data points in the point cloud 520, the calibration system can find an even smaller sub-region to search using an even smaller interval. In this manner, the calibration system can use progressively smaller intervals with which to move the expected shape in smaller sub-regions until eventually identifying the estimated wheel location 525. However, this is only one example of a suitable search algorithm. In another embodiment, the calibration system may perform only one sweep of the search area using a predefined interval and select the location where the expected shape includes the most data points of the point cloud 520 as the estimated wheel location 525. Thus, the embodiments herein are not limited to any particular search algorithm used to identify the estimated locations 525 of the wheels in the 2D sensor plane.

At block 415, the LIDAR sensor determines the LIDAR offset angle to the estimated location. That is, now that the estimated location of the wheel (or wheels) in the 2D sensor plane as shown in FIG. 5B has been identified, the LIDAR sensor can output the offset angle between the LIDAR reference and the estimated location of the wheel.

At block 420, the calibration system identifies the offset error by comparing the LIDAR offset angle to a known offset angle to the physical location of the moveable component. That is, the calibration system knows the LIDAR offset angle by performing blocks 405-415 which it can compare (e.g., subtract) from the known offset angle between the vehicle reference and the location of the moveable component. This known offset angle can be derived from the manufacturing process which defines the relative location of the moveable component (e.g., one or more wheels or an end effector of a robotic arm when performing LIDAR calibration) to the vehicle reference. If multiple moveable components are used during calibration, the calibration system can store the known offset angles for the plurality of components.

Figure 6:
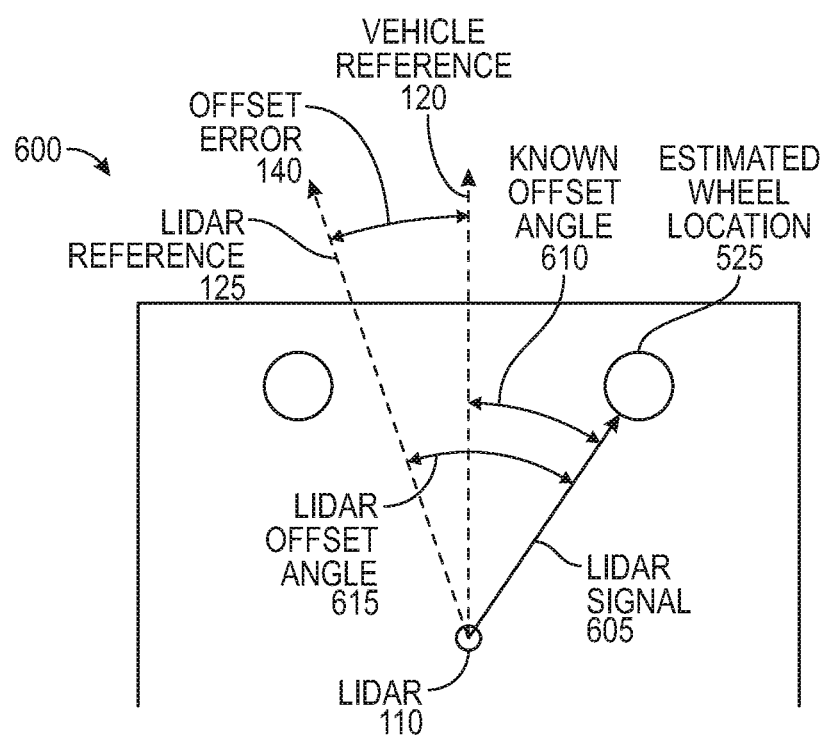
FIG. 6 illustrates identifying the offset error of a LIDAR sensor using a known location of a moveable component, according to one embodiment described herein.

FIG. 6 illustrates identifying the offset error of a LIDAR sensor using a known location of a moveable component, according to one embodiment described herein. FIG. 6 illustrates how the calibration system, when performing method 400, can identify the offset error 140. In this example, the calibration system has identified the estimated wheel location 525 in the 2D sensor plane which should match (or be close to matching) the actual location of the wheel that is mounted on the vehicle. Using the LIDAR signal 605, the LIDAR sensor 110 provides the LIDAR offset angle 615 which is the offset from the LIDAR reference 125 and the estimated wheel location 525. The known offset angle 610 may be identified from the design or manufacturing specs of the vehicle and represents the distance from the vehicle reference 120 to the actual location of the wheel. Identifying the difference between the LIDAR offset angle 615 and the known offset angle 610 provides a value of the offset error 140 - i.e., the angular difference between the vehicle reference 120 and the LIDAR reference 125. As discussed above, this offset error 140 can then be used to calibrate or correct the offset angles output by the LIDAR sensor 110 in the future so that these values are relative to the vehicle reference 120 rather than the LIDAR reference 125.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
rotating a moveable component attached to a vehicle;
capturing, as the moveable component rotates, distance and offset data of the moveable component using a LIDAR sensor attached to the vehicle, wherein the moveable component is in a 2D sensor plane corresponding to the LIDAR sensor, wherein the 2D sensor plane is parallel with the ground;
identifying an estimated location of the moveable component in the 2D sensor plane by matching an expected shape of the moveable component to a point cloud corresponding to the distance and offset data;
identifying a LIDAR offset angle from a LIDAR reference axis to the estimated location of the moveable component;
identifying an offset error by comparing the LIDAR offset angle to a known offset angle to the moveable component; and
correcting future offset angles output by the LIDAR sensor using the offset error.

2. The method of claim 1, wherein the moveable component is a wheel, wherein the wheel and the LIDAR sensor are mounted underneath the vehicle.

3. The method of claim 2, wherein rotating the moveable component rotates the wheel along a center axis so that the expected shape of the moveable component in the 2D sensor plane is a circle.

4. The method of claim 1, wherein the moveable component is an end effector of a robotic arm attached to the vehicle.

5. A system, comprising:
a dual-use component configured to perform a primary function and a secondary function, wherein the secondary function comprises performing LIDAR calibration;
a LIDAR sensor configured to capture data about the dual-use component as the dual-use component actuates during LIDAR calibration; and
one or more processors configured to use the captured data to identify an offset error between a LIDAR reference axis used by the LIDAR sensor and a predefined reference axis for the system, and to correct offset values output by the LIDAR sensor using the offset error so that the offset values are relative to the predefined reference axis rather than the LIDAR reference axis.

6. The system of claim 5, wherein the primary function of the dual-use component comprises moving a structure to which the dual-use component and the LIDAR sensor are attached.

7. The system of claim 5, wherein the primary function of the dual-use component comprises picking up and moving objects.

8. The system of claim 5, wherein the one or more processors are configured to determine an expected shape of the dual-use component as the dual-use component actuates in a 2D sensor plane of the LIDAR sensor.

9. The system of claim 8, wherein the one or more processors are configured to estimate a location of the dual-use component in the 2D sensor plane by matching the expected shape to a point cloud derived from the captured data.

10. The system of claim 9, wherein matching the expected shape to the point cloud comprises moving the expected shape to a plurality of locations in a search area and identifying a first location of the plurality of locations where the expected shape contains the most of the data points in the point cloud relative to the other locations of the plurality of locations.

11. The system of claim 10, wherein the one or more processors are configured to:
identify a LIDAR offset angle between the LIDAR reference axis and the first location; and
compare the LIDAR offset angle to a known offset angle between an actual location of the dual-use component and the predefined reference axis.

12. The system of claim 5, further comprising:
a second dual-use component configured to perform LIDAR calibration, wherein the second dual-use component actuates during LIDAR calibration in parallel with the dual-use component.

13. A non-transitory computer-readable storage medium having computer-readable program code embodied therewith, the computer-readable program code executable by one or more computer processors to perform an operation, the operation comprising:
capturing distance and offset data in a sensor field using a sensor disposed on a vehicle, wherein the distance and offset data corresponds to a wheel disposed on the vehicle;
rotating the wheel around a center axis while capturing the distance and offset data;
identifying an offset error between a sensor reference and a predefined vehicle reference using the distance and offset data; and
correcting offset values output by the sensor using the offset error so that the offset values are relative to the predefined reference axis rather than the sensor reference.

14. The computer-readable storage medium of claim 13, wherein the vehicle remains stationary as the wheel rotates around the center axis.

15. The computer-readable storage medium of claim 13, wherein the operation comprises:
determining, based on a physical dimension of the wheel, an arc shape of the wheel as the wheel rotates in the sensor field.

16. The computer-readable storage medium of claim 15, wherein the operation comprises:
estimating a location of the wheel in the sensor field by matching the arc shape to aggregated sensor data derived from the distance and offset data.

17. The computer-readable storage medium of claim 16, wherein matching the arc shape to the aggregated sensor data comprises moving the arc shape to a plurality of locations in a search area and identifying a first location of the plurality of locations where the arc shape contains the most of the data points in the aggregated sensor data relative to the other locations of the plurality of locations.

18. The computer-readable storage medium of claim 17, wherein the search area is defined based on a known separation distance between the sensor and the wheel.

19. The computer-readable storage medium of claim 17, wherein the operation comprises:
identifying a sensor offset angle between the sensor reference and the first location; and
comparing the sensor offset angle to a known offset angle between an actual location of the wheel and the predefined vehicle reference.

* * * * *